United States Patent
Murdoch et al.

(10) Patent No.: US 7,347,003 B2
(45) Date of Patent: Mar. 25, 2008

(54) DEVICE TO MEASURE AXIAL DISPLACEMENT IN A BOREHOLE

(75) Inventors: Lawrence Corlies Murdoch, Clemson, SC (US); Todd Alan Schweisinger, Seneca, SC (US); Cecil O. Huey, Jr., Clemson, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 11/787,177

(22) Filed: Apr. 13, 2007

(65) Prior Publication Data

US 2007/0193054 A1  Aug. 23, 2007

Related U.S. Application Data

(62) Division of application No. 11/005,199, filed on Dec. 6, 2004, now abandoned.

(51) Int. Cl.
*G01B 5/30* (2006.01)
(52) U.S. Cl. ............... 33/787; 33/790; 33/544; 33/302; 166/250.01
(58) Field of Classification Search ........ 33/787–790, 33/544, 302–304, 544.1, 544.2, 544.3; 166/250.01; 175/50
See application file for complete search history.

(56) References Cited

U.S. PATENT DOCUMENTS

| | | | |
|---|---|---|---|
| 3,456,504 A * | 7/1969 | Bombardieri | 73/152.39 |
| 3,668,927 A | 6/1972 | Howell et al. | |
| 4,116,274 A * | 9/1978 | Rankin et al. | 166/250.01 |
| 4,607,435 A * | 8/1986 | Boisen | 33/700 |
| 4,719,803 A | 1/1988 | Capelle et al. | |
| 4,852,648 A * | 8/1989 | Akkerman et al. | 166/66.4 |
| 5,503,230 A * | 4/1996 | Osborne et al. | 166/344 |
| 5,585,555 A | 12/1996 | McRea | |
| 5,629,480 A | 5/1997 | Herget | |
| 5,929,341 A | 7/1999 | Bawden et al. | |
| 6,065,218 A | 5/2000 | Edwards | |
| 6,311,564 B1 | 11/2001 | Martin et al. | |

\* cited by examiner

*Primary Examiner*—G. Bradley Bennett
*Assistant Examiner*—Tania C Courson
(74) *Attorney, Agent, or Firm*—Stephen R. Chapman (57) ABSTRACT

A device to measure minute displacement in rocks, including anchor deployment means, anchor registration means, and frame release means. Further including anchor units comprising a fixed anchor point, a reversible anchor actuator and a deployable anchor face capable of being deployed with a force of up to 2000 lbs.

9 Claims, 10 Drawing Sheets

DEVICE TO MEASURE AXIAL DISPLACEMENT IN A BOREHOLE

RELATION TO PRIOR APPLICATIONS AND FEDERAL RIGHTS

This application is a divisional of U.S. patent application Ser. No. 11/005,199 filed Dec. 6, 2004 now abandoned.

The invention was supported in part by Grant No. 20-201-XXXX-0919-206-2002030 from the National Science Foundation. The U.S. government has certain rights to practice or have practiced on its behalf the claimed technology.

FIELD OF THE INVENTION

The invention is in the general field of technical and scientific equipment used in field studies in the earth sciences. More specifically it is a device to measure with a high degree of precision axial displacement in a borehole wherein the axial displacement occurs in response to the removal or injection of a fluid, or the dissolution of a mineral. Specifically, the patent is directed to a unique removable borehole extensometer and to a device to detect minute changes in rock structures comprising an axial support system and elements of a borehole extensometer.

BACKGROUND OF THE INVENTION

Extensometers have been used to measure movement in naturally occurring rock structures, in coal mine roofs, and in foundations. Such changes are of basic scientific interest and of practical significance. Monitoring minute changes in naturally occurring fractures provides important information concerning the flow of ground water and potential transport of pollutants as well as the geological impact of either the extraction or injection of fluids into boreholes on fracture stability.

U.S. Pat. No. 5,929,341 issued to Bawden, et al on Jul. 27, 1999 describes and claims a device that indirectly measures stability of rock strata by measuring stress exerted on support cables positioned to support otherwise unstable material. The device finds particular application in the mining industry in which blocks of ore of a maximum dimension are removed potentially weakening remaining rock or with mining operations where the rock is inherently weak or fractured. The '341 invention addresses cable geometry and various systems to anchor the cable, such that elongation of the cable accurately reflects stress and the movement of rock.

U.S. Pat. No. 6,311,564 issued to Martin, et al. on Nov. 6, 2001 describes and claims an apparatus to provide support for a structure (i.e. rocks) and for measuring stress on the apparatus from the structure. The apparatus comprising an elongated center wire, several stress measuring devices, such as wire or other strain gauges positioned along the wire, a forming material encasing the center wire, several non-center wires extending longitudinally from the center wire and wound around the length of the center wire, stress measuring devices, and forming material, and a device to collect data. The apparatus is useful in measuring stress in the roof structure of a coal or similar, underground mine, or rock mass.

Capelle, et al. in U.S. Pat. No. 4,719,803 describe and claim improvements in a borehole extensometer. Compared with ten existing borehole extensometers, the '803 improvements eliminate the requirement of a surface reference head and the borehole extensometer is capable of providing in borehole displacement measurements.

U.S. Pat. No. 5,585,555 issued to McRea on Dec. 17, 1996 describes and claims a multiple position, recoverable borehole strainmeter. The device includes two or more anchors with releasable pistons that engaged the walls of the borehole to mount the strainmeter in the borehole. A relative displacement sensor senses changes in the relative displacement between adjacent anchors thereby measuring mass displacement axially along the borehole between the anchors. The pistons are independently, gas operated.

U.S. Pat. No. 5,629,480 issued to Herget on May 13, 1997 describes and claims an extensometer for use in a borehole. The device comprises a combination of linear motion transducers located with daisywheel anchors.

U.S. Pat. No. 4,607,435 issued to Boisen on Aug. 26, 1986 claims a temperature-compensated borehole extensometer. The device compensates for temperature effects on sensing rods by use of an element with materials of disparate linear coefficients of expansion.

SUMMARY OF THE INVENTION

A purpose of the invention is a device capable of detecting and measuring displacement in boreholes caused by very small movements occurring in fractures. A further purpose is a device capable of being easily removed from a borehole in which it is positioned by retracting anchoring means. A still further purpose is a device capable of compensating for the effects of temperature on the expansion/contraction of the equipment, hence on the accuracy of measurements.

These and other purposes are achieved by a device with two major components: an axial support that holds all measuring equipment and provides the structure by which the device is lowered into and extracted from a borehole, and a group of elements directly or indirectly connected to the axial support and that in structure and function combine to measure very small movements in rocks; these elements include at least one pair of anchor units each member of the pair having a fixed point, a deployable face, and an actuator that the force to secure the anchor, a proximal reference rod and a distil reference rod, each of which is physically connected to one of the two anchor units, a temperature compensating means to the proximal reference rod and supporting the displacement transducer which is in contact with the distil reference rod, a registration element that sets the benchmark distance between the anchor units and the critical space between the proximal and distil reference rods by insertion of a deployable/extractable element; in addition, these and other purposes of the invention are further achieved by a borehole extensometer that is readily removed from a borehole that comprising a central support rod on which are positioned two registration units each associated with an individual anchor unit that is deployable and retractable and has a mechanical locking device, a temperature compensating unit, and a displacement transducer.

BRIEF DESCRIPTION OF THE FIGURES

FIG. 6A illustrates a borehole extensometer with a central

FIG. 6B provides support rod and mechanically deployable anchor legs.

details of the registration unit for an extensometer with a central support rod.

DECRIPTION OF PREFERRED EMBODIMENTS

Functionally, the borehole extensometer measures displacement in rock structures by sensing minute (micrometers) movement of the rocks on opposite sides of a naturally occurring fracture, or set of fractures. Anchors are firmly attached on opposite sides of the structure (fractured zone), and a device is positioned between the anchors to detect any change in the distance between the anchor points. When the anchors are secured and temperature effects on measuring equipment are accounted for, only movement of the rock structure between the anchors will cause displacement of the measuring device.

The registration device set the initial position of the anchors in the borehole and establishes an appropriate distance between functional components of the linear variable differential transformer. The leg deployment capabilities also allow retraction of the legs and thus removal of the extensometer from the borehole.

EXAMPLE 1

Figure 1:
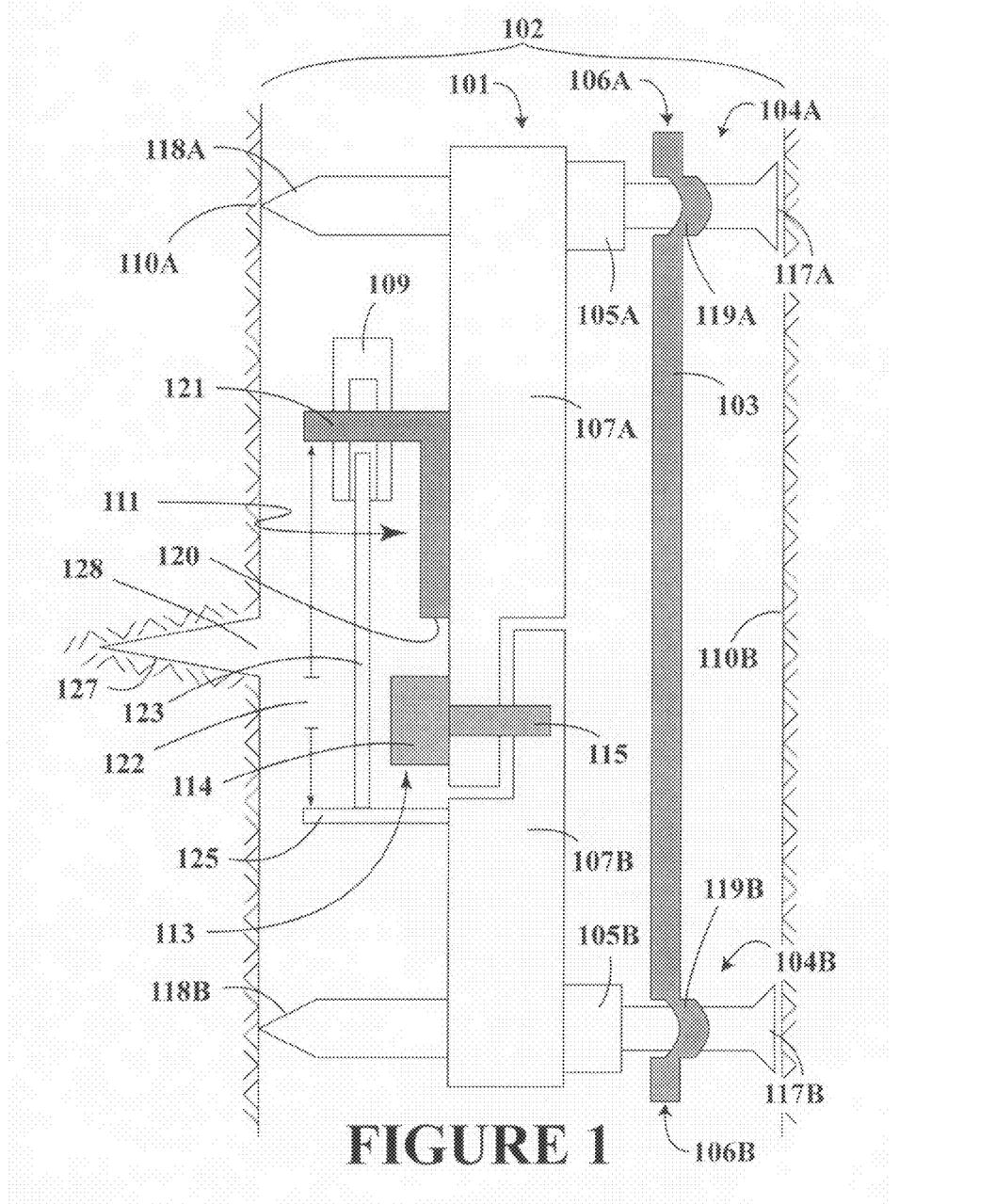
FIG. 1 describes a device to measure changes in rock structures comprising an axial frame unit and elements of an extensometer.

A device to measure minute displacements in rock structures is described in reference to FIG. 1. Functionally, the device 101 comprises two major components: an axial frame 103 and six units of an extensometer: proximal and distil anchor units 104A and 104B, respectively, at least a proximal reference rod 107A and a distil reference rod 107B, a temperature compensating means 111, a displacement transducer 109, a proximal 119A and a distil 119B frame release unit, and a reference rod registration element 113.

The axial frame 103 has a proximal (upper) end 106A and a distil (lower) end 106B. The proximal end 106A of the axial frame 103 is releasably connected to the proximal anchor unit 104A by means of the proximal release unit 119A, and the distil end 106B of the axial frame 103 is releasably connected to the distil anchor unit 104B. In this manner, the axial frame supports all units of the extensometer until the proximal anchor unit 104A and distil anchor unit 104B are deployed and securely positioned in the borehole as further described below.

The proximal reference rod 107A is firmly attached to the proximal anchor unit 104A and extends vertically downward towards the distil anchor unit 104B. The distil reference rod 107B is similarly attached to the distil anchor unit 104B and extends vertically upward towards the proximal anchor unit 104B.

When operationally deployed in a borehole, the extensometer detects changes in the dimensions 128 of the fracture aperture 127 in a rock surface as a direct change of the space 122 detected by the displacement transducer 109. To detect minute changes, the initial, or bench mark space 122, must be established. This is accomplished by the registration element 113. A deployable registration pin 115 passes through a precisely positioned and aligned opening in the proximal reference rod 107A, to which the registration element is attached, into a precisely aligned opening in the distil reference rod 107B. The registration element 113 comprises a cylinder 114 capable of being pressurized and alternately pressurized into which the deployable registration pin 115 is positioned, a piston to deploy the pin into position connecting and precisely aligning the proximal and distil reference rods, and essential fittings as described in detail in FIG. 4.

The registration element 113 also serves as a locking mechanism to fix the position of the reference rods 107 during transport and positioning of the extensometer. Once the deployable registration pin 115 has been disengaged, the reference rods are completely free to move relative to each other.

To ensure maximum accuracy and detection of minute displacements of the rock, in addition to the critical registration of reference rods, temperature induced variations in the length of the proximal 107A, and distil 107B reference rods that could affect the initial or bench mark space 122 are detected by and compensated for by the displacement transducer 109 operating functionally in association with the temperature compensating means 111. The temperature compensating means 111 comprises a metallic expansion element 121 (preferably a brass rod) connected to the proximal reference rod 107A at its distil tip 120 by mechanical means, preferably a screw. The metallic expansion element 121 supports the displacement transducer 109 and is in functional communication with it to measure the initial or bench mark space 122. The metallic expansion element 121 is fabricated from material with a larger thermal expansion coefficient than the material from which the proximal reference rod 107A and the distil reference rod 107B are fabricated. The metal expansion element is shorter in length than the reference rod to which it is attached. The differences in length combined with the differences in expansion coefficient allow for precise compensation for temperature induced changes in the reference rods, thus in the initial or bench mark space 122. As one skilled in the art recognizes, in this manner when the extensometer is deployed and the deployable registration pin retracted, only movement of the rock will cause movements to be sensed by the displacement transducer.

A metallic plunger rod 123 is mechanically connected to the upper face of the distil reference rod 125 preferably by threaded means, and the metallic plunger rod 123 moves freely in its functional relation with the displacement transducer 109. With the deployable registration pin 115 retracted, changes in the initial or bench mark space 122 detected by the displacement transducer 109 as a function of the relative position of the metallic plunger rod 123 reflect displacements the rock, not temperature effects.

The proximal anchor unit 104A and distil anchor unit 104B are comparable in structure and function. Thus the following description of the proximal anchor unit 104A is fully applicable to the distil anchor unit 104B.

The proximal anchor unit 104A comprises three functional elements: a fixed anchor point 118A, an anchor actuator 105A, and a deployable anchor face 117A. Corresponding parts for the distil anchor until 104B are 118B, 105B, and 117B, respectively. The anchor actuator applies pressure (up to 2000 PSI) to extend the deployable anchor face 117A outward against the borehole wall 110B. Deployment of the deployable anchor face 117A and 117B and the resultant force exerted by them against the wall 110B of the borehole forces the fixed points 118A and 118B to contact and anchor to the opposite side of the borehole 110A. Pressure to extend the deployable anchor face 117A and 117B may be provided through the anchor actuators 105A and 105B, respectively, by pneumatic means or by hydraulic means. When deployed and secured in position, the anchor units 104A and 104B support the extensometer and simultaneously release the axial frame from the extensometer by disengaging the proximal frame release unit 119A and distil frame release unit 119B.

Functionally, the device 101 is connected by the axial support 103 to an external mechanical device (not illustrated) that lowers the device into the borehole 102 to a predetermined depth and supports the axial frame unit 103. The anchor actuators 105A and 105B are activated and the deployable anchor face 117A and 117B and fixed anchor points 118A and 118B secure the extensometer in position. The deployable registration pin 115 holds the proximal reference rod 107A and the distil reference rod 107B in the initial or bench mark space 122 with respect to the temperature compensating means 111. The functional elements are disengaged from the axial frame 103 by activation of the proximal and distil release units 119A and 119B respectively. The deployable registration pin 115 is retracted into the registration element 113, and changes in the initial or bench mark space 122 must be due to changes in the fracture 127 as detected and recorded by the displacement transducer 109.

The following dimensions and materials are examples of acceptable ranges not limitations on the invention.

The axial frame is manufactured from aluminum to support the elements of the extensometer. Maximum length of the entire device is approximately 12 feet (4 meters), and the width established by the diameter of the borehole (hence of the extension of anchor elements) ranges from a minimum of 2 inches (5 cm) to a practical, but not technical limitation of 36 inches (93 cm).

The displacement transducer is commercially available (for example. Macro Sensors, Pensaukenn, N.J.) and reference rods are made from Invar (Carpenter direct, Reading, Pa.). Reference rods jointly are up to 12 feet (4.0 m), with each rod ranging from 4 to 5 feet (about 1.8 m). Rods are generally 0.5 inch (1.3 cm) in diameter. Other rods and plungers are preferably stainless steel; the metallic expansion unit may be aluminum or brass. The fixed anchor points are carbide.

Figure 2:
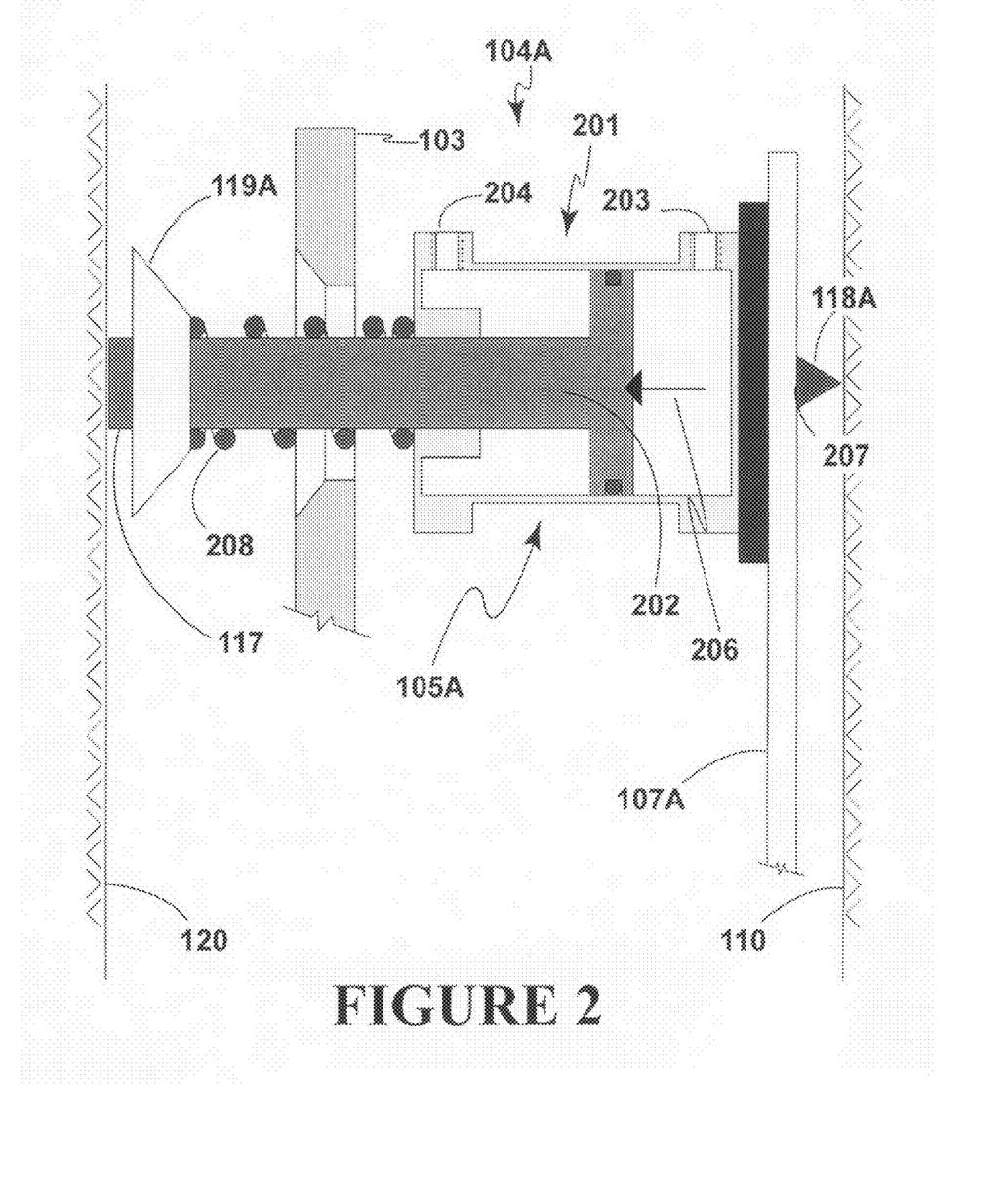
FIG. 2 illustrates details of anchor units to secure elements of an extensometer in a borehole.

Structurally and functionally, the proximal anchor unit 104 and the distil anchor unit 104B are the same. A single anchor unit 104 representing either or both is illustrated in FIG. 2. Numbers indicating parts previously identified and described in FIG. 1 are retained, but letters designating "proximal" or "distil" distinction are omitted.

In FIG. 2, the anchor unit 104 comprises the fixed anchor point 118, the deployable anchor face 117, and the anchor actuator 105. The anchor actuator comprises a cylinder housing 201 that encases a cylinder plunger 202 with a pressure input value 203 and alternate pressure valve 204. Reference rod 107 is physically connected to the base region 207 of the fixed anchor point 118. The cylinder plunger 202 passes through the axial support 103; as illustrated, the frame release unit 119 is released, and the deployable anchor face 117 is pressed against or into the borehole wall 110. The fixed anchor point 118 is embedded into the borehole wall at a position opposite the deployable anchor face 117.

Figure 3:
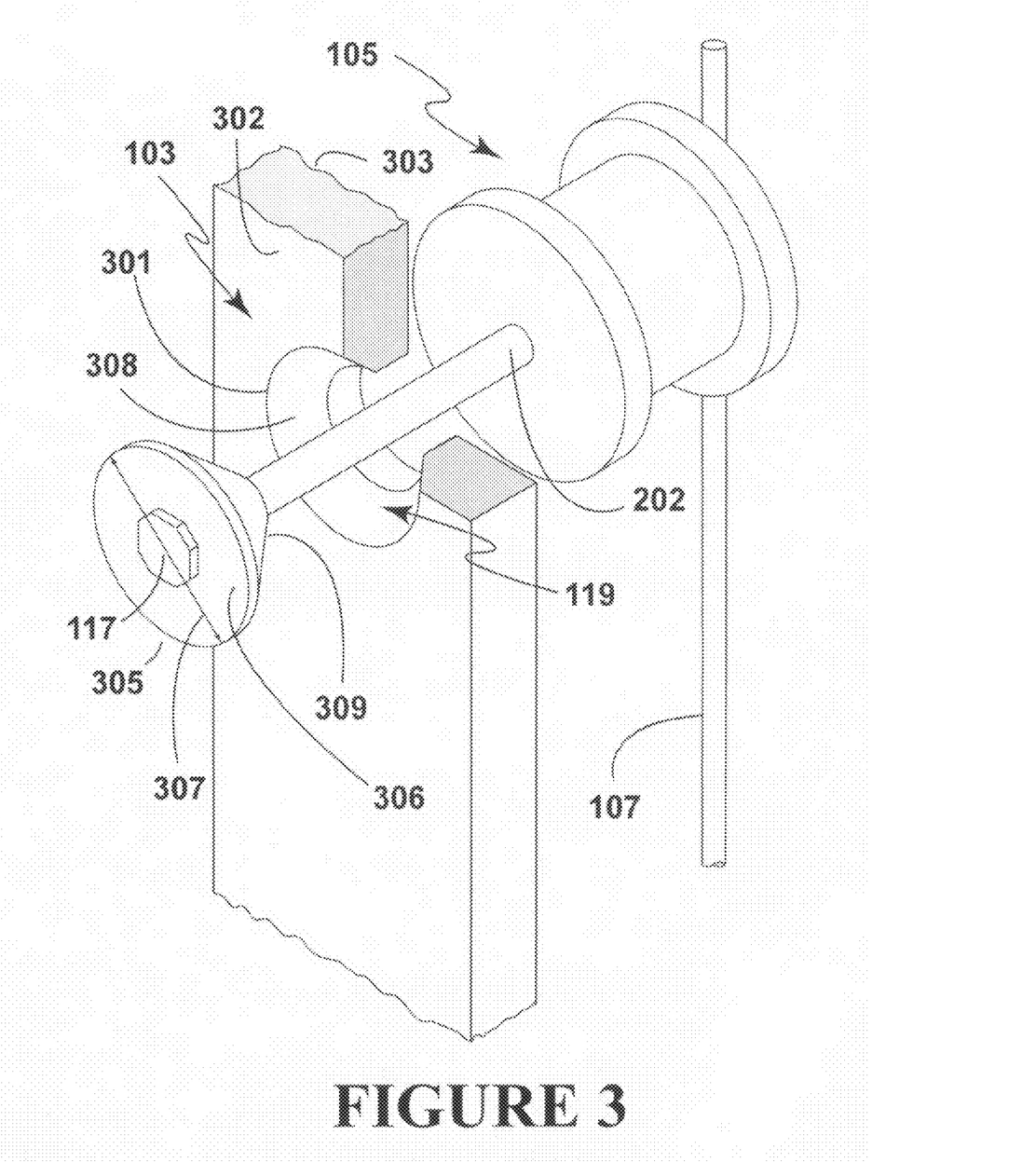
FIG. 3 illustrates details of the frame release units.

The cylinder is pressurized by introducing fluid (liquid or air) under pressure (up to 2000 PSI) via the pressure input valve 203. Pressure causes the cylinder plunger 202 to move outward, in direction of arrow 206. Pressure and resulting movement cause fixed anchor point 118 to be embedded in borehole wall and deployable face 117 to be pressed tightly to, or imbedded in the borehole wall. An optional coil spring 208 holds the cylinder plunger 202 in the deployed position, rather than continued pressure application. The deployable anchor faces are retracted by reversing the cylinder pressure via pressure release valve 204. The optional spring 208 is mechanically compressed, and the device may be removed from the borehole. As the deployable anchor faces are retracted, the frame release unit reengages to secure the axial frame and extensometer as illustrated in FIG. 3.

Structurally and functionally, the proximal and distil frame release units, 119A and 119B, respectively, are the same. A single frame release unit, 119 representing either or both frame release units is illustrated in FIG. 3. Numbers indicating parts identified and described in FIG. 1 and FIG. 2 are retained, but the letters designating "proximal" or "distil" distinctions are omitted.

The frame release unit functions in response to pressurizing the cylinder of the anchor actuator 105. The frame release unit 119 comprises a beveled opening 301 in the axial frame 103 member, and a securing cone 305 attached to the cylinder plunger 202, with the deployable anchor face 117 connected to the distil surface 306 of the securing cone 305.

The beveled surface 308 of the opening 301 slopes inward at a constant angle from the exterior surface 302 of the axial frame 103 member to the interior surface 303. The securing cone 305 is beveled 309 at an angle complimentary to the slope 308 of the beveled opening 301. The maximum diameter of the securing cone 307 is nominally equal to, or greater than the diameter of the beveled opening on the exterior surface 302 or the axial frame 103 member.

As illustrated in FIG. 3, the deployable anchor face 117 is extended (deployed) and the securing cone 305 is disengaged from the axial frame by extension of the cylinder plunger 202 in response to pressurizing the anchor actuator 105. In this configuration, the reference rods and all associated parts of the extensometer are freed from support by the axial frame and supported in the borehole by the anchor units (104A ad 104B of FIG. 1). When pressure in the anchor unit 105 is reversed, the cylinder plunger 202 retracts, and the securing cone 305 reengages the axial frame 103 member, thereby reconnecting the extensometer to the axial frame unit.

Figure 4:
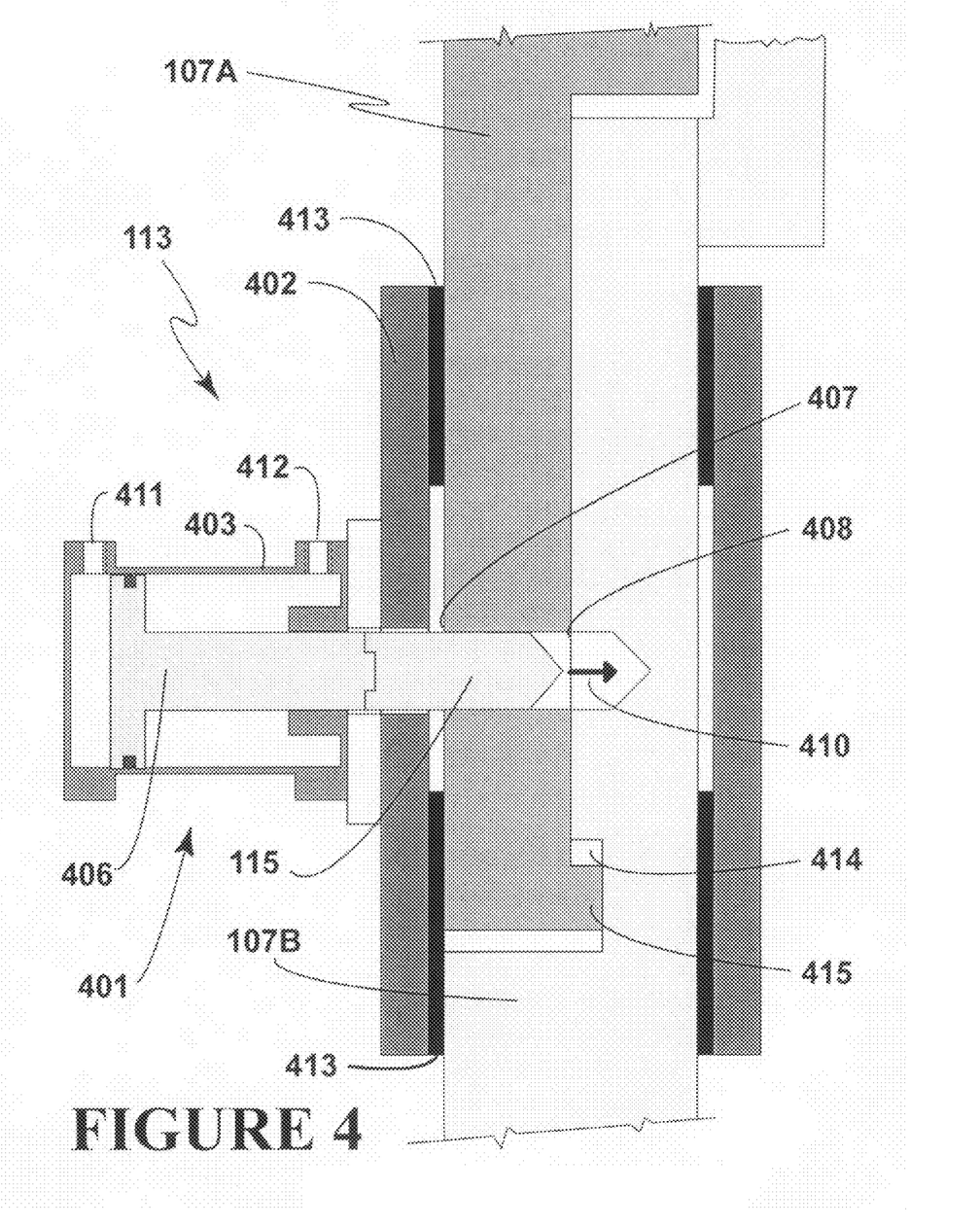
FIG. 4 provides details of the registration element in relation to the reference rods.

As illustrated in FIG. 4, the registration element 113 comprises a registration rod actuator 401 mounted on a registration rod housing 402 comprising a cylinder 403, that when pressurized via valve 411 causes the registration rod plunger 406 to move the registration pin 115 through the opening 407 in the proximal reference rod 107A and to engage a precisely aligned opening 408 in the distil reference rod 107B, thereby aligning the distil reference rod 107B with the proximal reference rod 107A in relation to space 122 (FIG. 1). The registration pin 115 supports the reference rods 107A and 107B when the pin 115 is fully deployed. The reference rod plunger 406 moves forward in the direction of arrow 410 when pneumatic pressure is introduced via value 411. Pressure is applied via value 412 and the registration pin 115 retracted. Bearings 413 in the reference rod housing 402 allow the proximal reference rod 107A to move freely into alignment with opening 408 in the distil reference rod 107B to effect the essential registration of reference rods 107A and 107B with respect to space 122 (FIG. 1).

The reference rods 107 are locked in position relative to each other when the registration pin 115 is engaged in the opening in the distil reference rod 107B. Retracting the registration pin 115 so that it is contained within the proximal reference rod 407 completely decouples the proximal 107A and distil reference rods 107B so they are free to move axially.

The reference rods 107A and B are round, except where they overlap at the registration element 113 in FIG. 4. The overlap is achieved by machining the rods so they are semi-circular in cross-section over a distance of approximately 4 inches (10 cm) in FIG. 4. The overlapping region of the reference rods is enclosed in two sleeve bearings 413 so the rods remained aligned, but are free to move relative to each other along their axes.

The correct functioning of the registration element requires that the opening in the proximal rod 407 never becomes misaligned with the opening in the distil rod 408 by more than half the diameter of the registration pin 115. The travel of the reference rods is limited to ensure correct functioning of the registration element. The travel is limited by a rectangular protuberance 415 machined into the end of the proximal reference rod and a rectangular slot 414 machined into the distil rod. The width of the slot 414 is 0.1 inch (2.5 mm) wider than the width of the protuberance 415. The relative motion of the proximal and distil rods is limited when the face of the rectangular slot engages the face of the rectangular protuberance.

Figure 5:
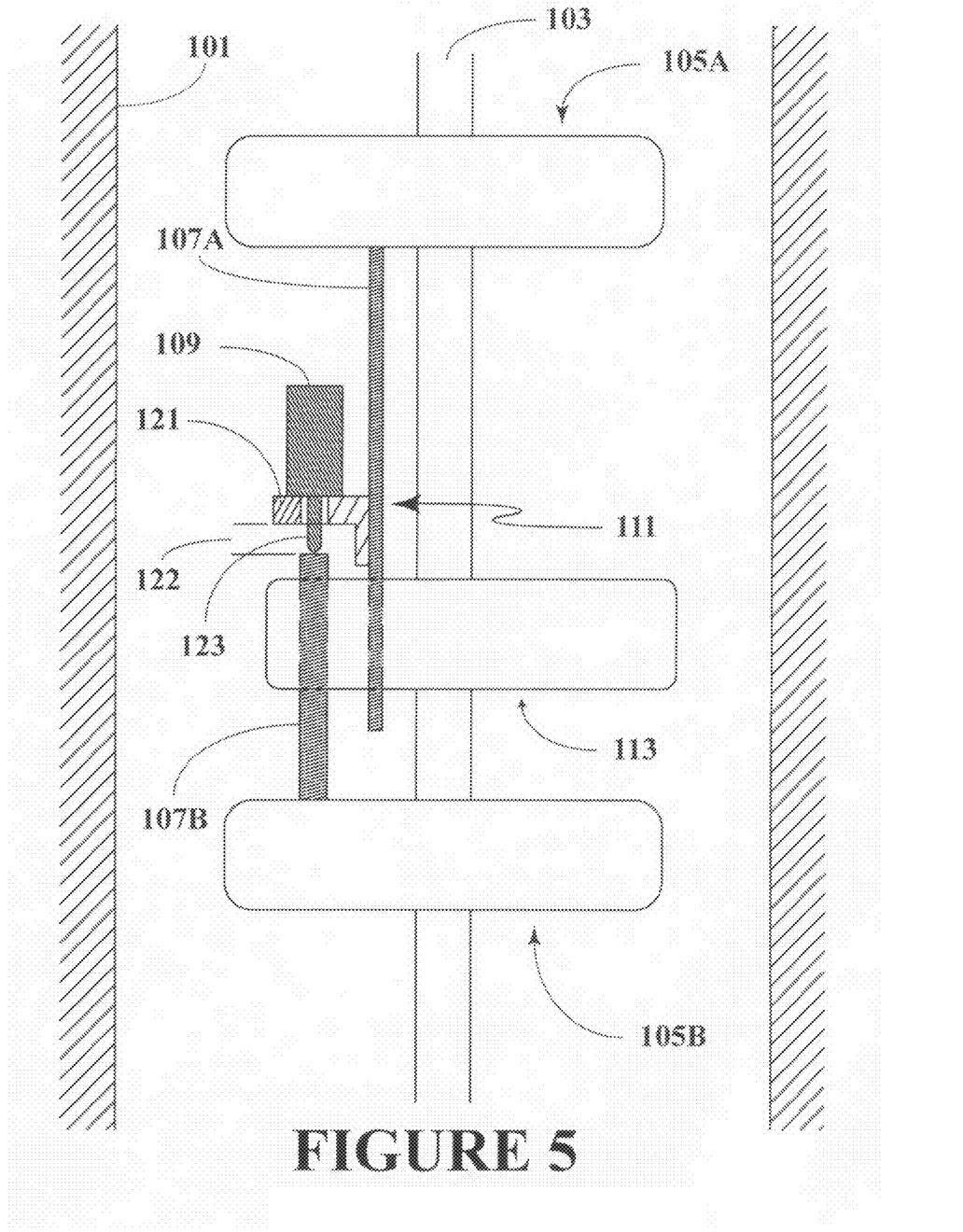
FIG. 5 provides details of the temperature compensation means for the device with an axial frame unit.

Details of the temperature compensation means 111 and its relation to the displacement transducers are shown in FIG. 5. The general structures illustrated in FIG. 5 are also applicable to the extensometer illustrated in Example 2.

EXAMPLE 2

Figure 6A:
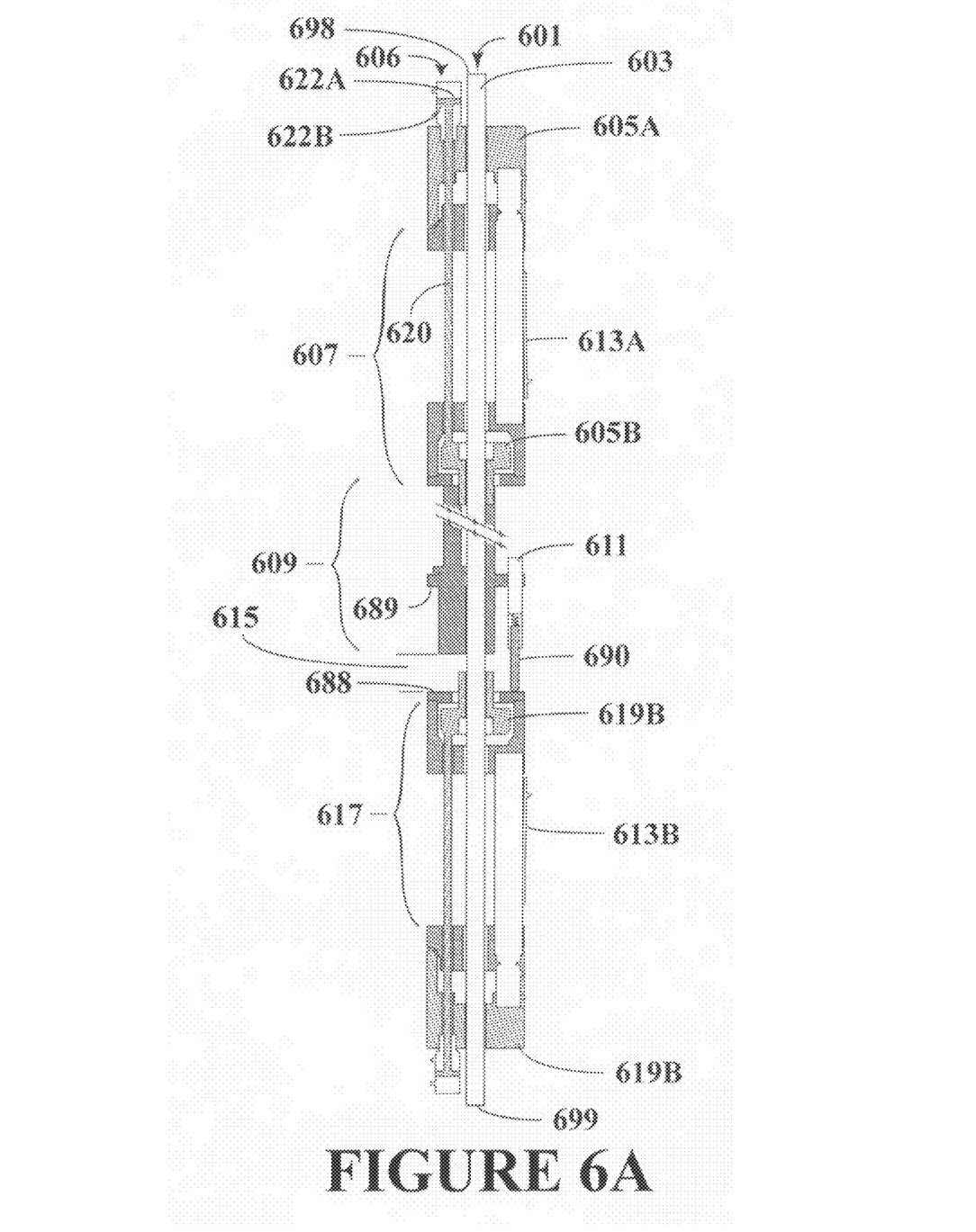

FIG. 6A illustrates a borehole extensometer 601 that incorporates the reference rods, temperature compensation means, and registration means of Example 1 and that incorporates a central support rod 603 in lieu of the axial support frame of Example 1 and at least two, extendable/retractable, mechanically lockable legs that anchor and support the functionally positioned extensometer.

The borehole extensometer of FIG. 1, like the device of Example 1, is capable of detecting very small changes in displacement caused by minute increases or decreases in the aperture of a fracture of a rock structure. The borehole extensometer 601 comprises a central support rod 603, preferably stainless steel of various lengths and diameter. Lengths of 8 feet (2.75 meters) and diameter of 0.75 inches (2.0 cm) are appropriate, but not limitations. The support rod 603 has a top end 698 and a bottom end 699. The following description is from the top end 698 towards the bottom end 699.

An upper registration unit comprised of an upper cylinder station 605A and upper slideable element 605B is positioned on the support rod 603. An upper anchor 607 is positioned between the upper cylinder station 605A and an upper slideable element 605B. An cylinder 606 threads on to an cylinder station and rod 620 connects the piston of the cylinder 606 to the upper slide unit 605B. Pressure applied to the upper surface 622A of the plunger rod forces the upper cylinder 605A apart from the upper slideable element 605B and pressure on the lower surface 622B brings these structures together. Movement of the upper cylinder 605A station and upper slideable element 605B serves to allow control of the position and orientation of the upper anchor 607.

Figure 7:
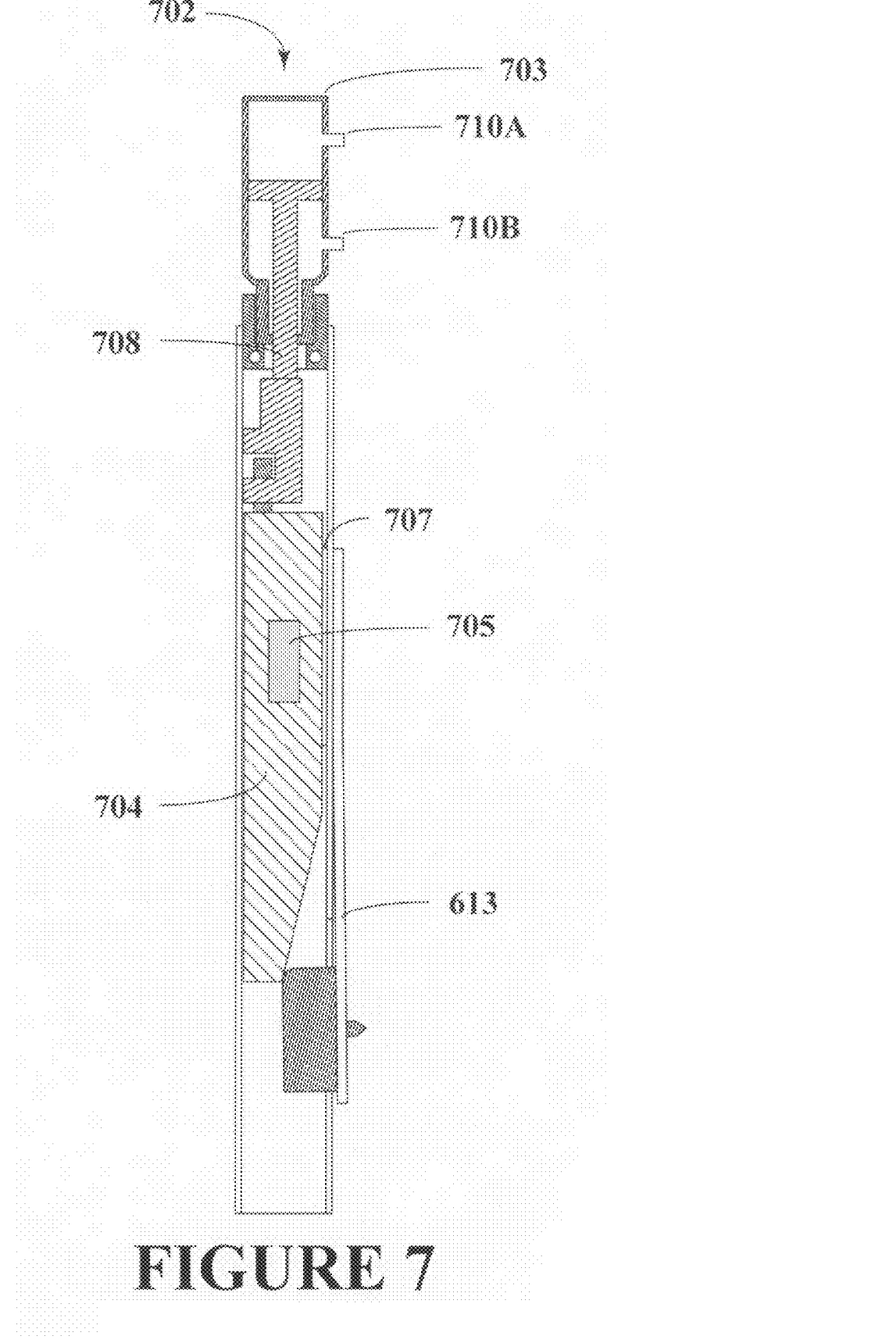
FIG. 7 illustrates details of the actuator and deployable legs.

The upper anchor 607 comprises deployable legs 613 and a pneumatic or hydraulic powered deployment means with latch capabilities and retraction capability (see FIG. 7).

The temperature compensator 609 and linear varying differential transducer 611 are positioned immediately below and in contact with the bottom surface of the upper anchor 607. A spring loaded, plunger 690 that is part of the linear varying differential transducer 611 is positioned below the lower surface 689 of the temperature compensator, and that surface 689 is separated from the upper surface 688 of the lower anchor 617, by a space 615. In operation, the sensor contact 690 is in physical contact with the upper surface 689 of the lower anchor 617. The structure and functions of the lower registration slider 619B, air cylinder station 619A, and anchor legs are as described above for corresponding structures.

Figure 6B:
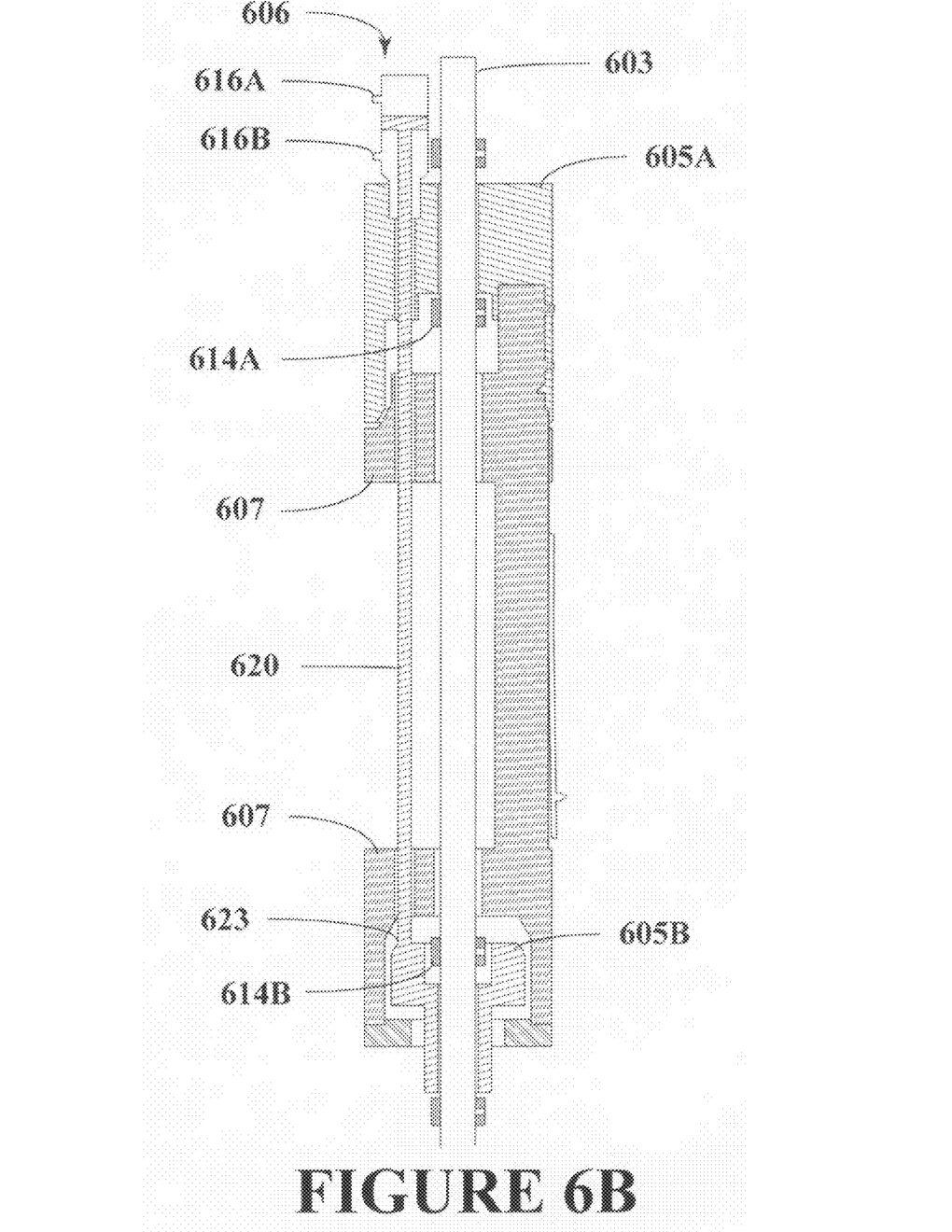

Details of the registration are shown in FIG. 6B. The upper air cylinder station 605A is physically linked to the slideable cylinder 605B by a plunger-like rod 620. Pressurized air entering the air cylinder 606 at the upper fitting 616A exerts downward pressure on the plunger-like rod 620, and pressure entering at the lower fitting 616B exerts upward pressure on the plunger-like rod 620 which is physically attached to the slideable unit 605B at a point 623.

Maximum travel of the upper air cylinder station 605A and slide unit 605B is limited by stops 614A and 614B positioned on the support rod 603. Controlled movement of the upper air cylinder station 605A and slideable unit 605B in response to injection of air through fittings 616A and 616B allow positioning of the anchor 607.

FIG. 7 illustrates the actuator 702 with deployable legs 713 and powered by air pressure from an air cylinder 703 air pressure from the air cylinder 703 exerts pressure on a moveable wedge 704. The moveable wedge, when moving downward, exerts outward pressure on leg 613 thereby deploying leg 613. Tooth surfaces 707 on the actuator engage a pistol latch device 705 to hold deployed leg in position when air pressure is released. A plunger device 708 is connected to the moveable wedge 704. Air pressure can be introduced at first point 710A above the plunger device 708 and causes the device to move downward, thereby deploying the legs 613 and causing the latch 705 to engage the toothed surface 707 of the leg 613 and holding the leg securely in the deployed position. Air pressure introduced at a second point 710B below the plunger device 708 causes the wedge to move upward, releasing the latch, and thereby retracting the legs 613.

Figure 8:
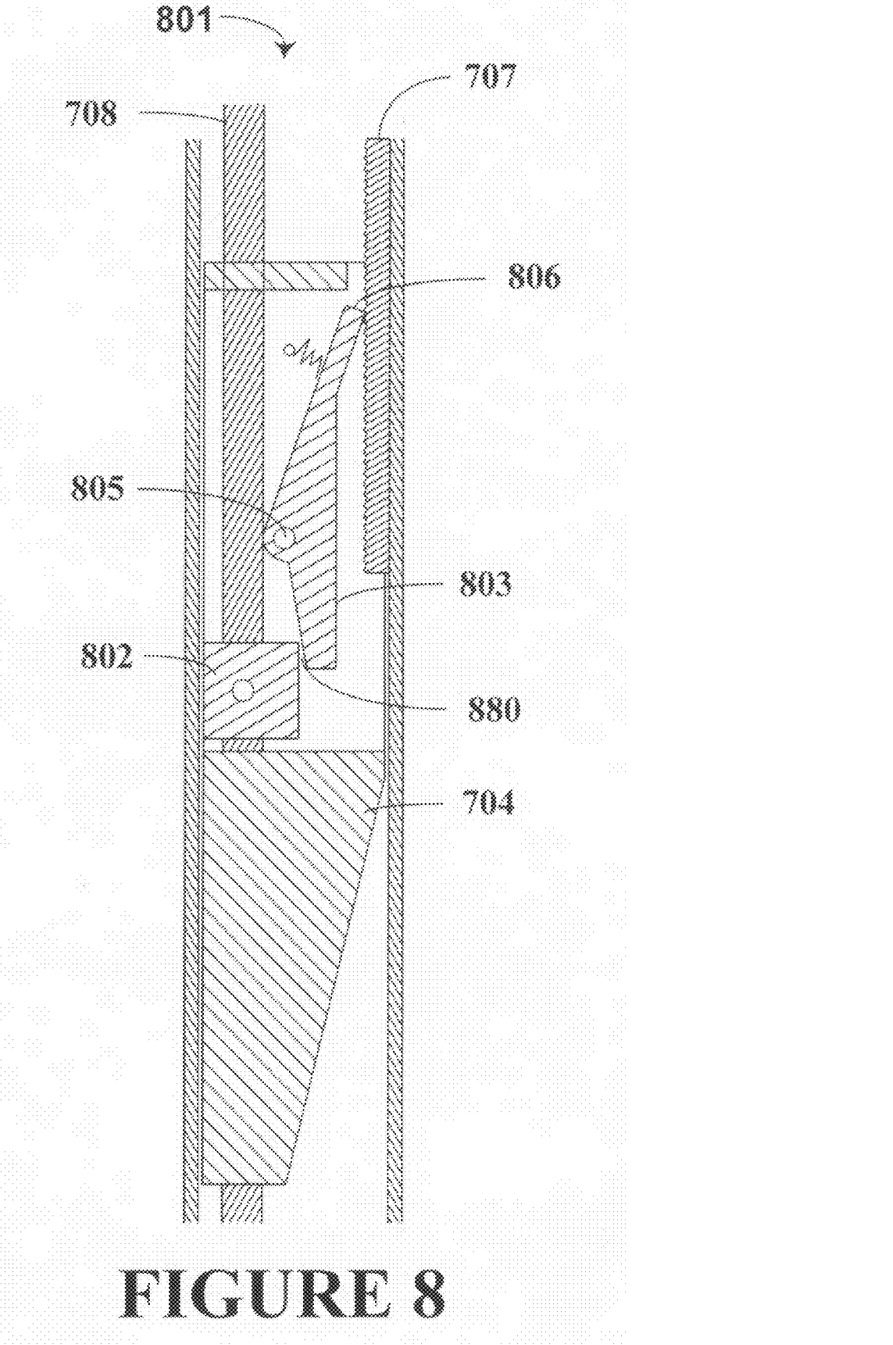
FIG. 8 provides details of the ratchet/lock system to secure deployable legs.

FIG. 8 illustrates details of the ratchet/lock system 801 used in deploying the legs 113. The plunger device 708 contacts the wedge 704 and is also connected to a block 802 that engages the first end 880 of the lock arm 803 that is pivoting mounted 805 to allow the second end 806 of the lock arm 803 to engage the tooth structure 707 of the actuator. Downward pressure forces the legs 113 outward in a deployed configuration, upward pressure forces the wedge 704 upward, releasing the lock and thereby allowing the legs 613 to be retracted and the extensometer 601 to be moved in or removed from the borehole.

Figure 9:
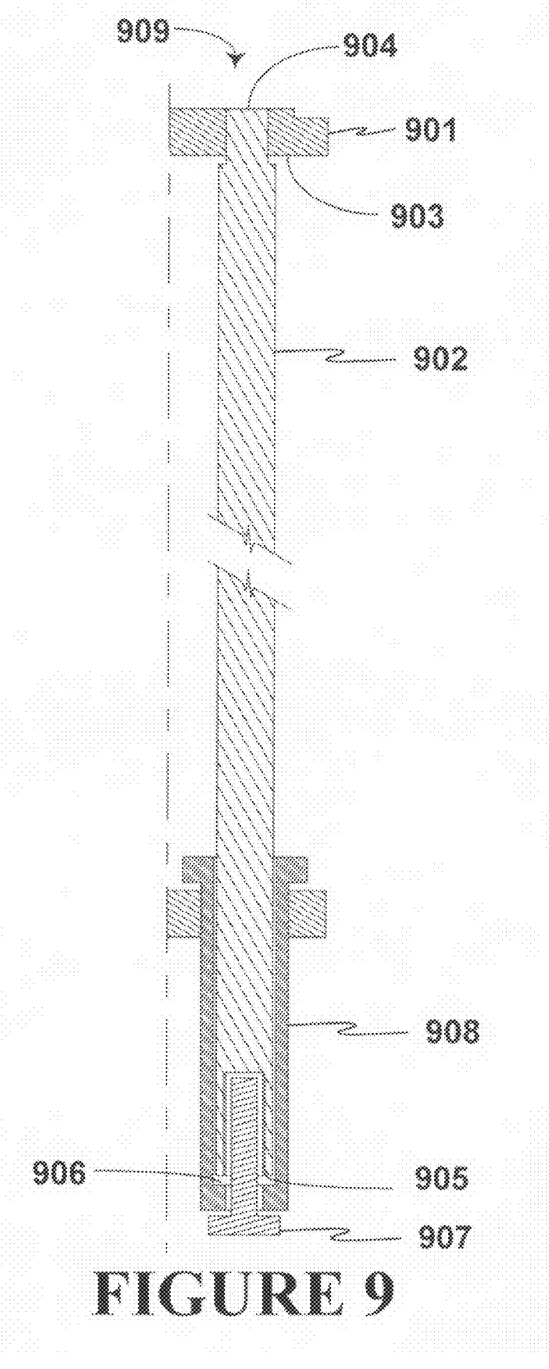
FIG. 9 illustrates the major components of the temperature compensator used with an extensometer having a central support rod and deployable legs.

FIG. 9 illustrates the major components of the temperature compensator 909. At least one invar rod 902 is connected by a first end 904 to the bottom 903 of the anchor 607 by screw-thread means. A second end 905 of the invar rod 902 is bolted 907 to the floor 906 of the brass expansion tube 908. The brass expansion tube 908 encases a portion of the invar rod. Heating or cooling cause the invar rod 902 and brass expansion tube 908 to expand to different degrees, but absolute differences are effectively the same owing to difference in length and material properties between the invar rod 902 and brass expansion tube 908.

Specific terms, devices, and descriptions are used for purposes of illustration, not limitations of the invention. In addition, one skilled in the art recognizes that various elements of different embodiments can be interchanged to yield still more embodiment, all of which are anticipated in the scope and intent of the invention. Consequently, the appended claims should be accorded the widest-scope of interpretation, and not be limited by the specific term, devices, and descriptions herein.

What is claimed is:

1. A device capable of measuring minute axial displacement of rock structures in a borehole, comprising:

a releasable-deployable axial frame, wherein said releasable-deployable axial frame supports and positions a proximal anchor unit and a distil anchor unit in a borehole until each of said proximal anchor unit and said distil anchor unit is securely attached by fixed anchor points to the wall of said borehole and said releasable-deployable axial frame is released; said proximal anchor unit and said distil anchor unit each comprises a fixed anchor point, a reversible anchor actuator, and a deployable anchor face capable of being deployed with a force of up to 2,000 pounds, whereby said anchor points secure said anchor unit to said borehole wall opposite the point of contact of said anchor face with said borehole wall;

means to measure axial displacement of rock structure in a borehole comprising: a pair of reference rods, temperature compensating means, a displacement transducer, a proximal and a distil axial frame release, and a reference rod registration element, wherein, wherein the proximal end of said releasable axial frame is releasably connected to said proximal anchor unit and the distil end of said releasable axial frame is releasably connected to said distil anchor unit; and further wherein the first member of said pair of reference rods is securely attached to said proximal anchor unit, extending vertically towards said distil anchor unit, and the second member of said pair of reference rods is securely attached to said distil anchor unit, extending vertically towards said proximal anchor unit; and further, wherein said proximal anchor unit and said distil anchor unit each comprise said fixed anchor point structurally opposite said deployable anchor face, and said anchor actuator capable of causing the deployment said deployable anchor face with up to 2000 pounds force whereby said anchor unit moves forcefully in a direction opposite the direction of deployment and contact of said anchor face with the wall of said borehole and further whereby said anchor point securely connects said anchor unit to said borehole wall; a deployable reference pin, part of the reference rod registration element, positions and aligns said first reference rod and said second reference rod thereby establishing a baseline distance from which axial displacement of rock structures in said borehole between said proximal anchor unit and said distil anchor unit are measured; said first member of said pair of pair of reference rods moves freely in relation to said second member of said pair of reference rods when said releasable axial frame is disengaged from said proximal anchor unit and from said distil anchor unit and when said deployable reference pin is also disengaged from said first member of said pair of reference rods and from said second member of said pair of reference rods; a plunger piece is attached to the upper surface of said distil anchor unit and said displacement transducer is linked to said proximal anchor unit; said plunger piece is functionally connected to said displacement transducer such that movement of said plunger piece caused by relative movement of said proximal anchor unit and said distil anchor unit is measured as movement of the rock surfaces on which said anchor units are secured by said anchor points; a temperature compensating means is connected to said proximal anchor unit and provides connection by a metal expansion element to support said displacement transducer and adjust movement to account for effects of temperature variations.

2. The device of claim 1 wherein said distil anchor unit and said proximal anchor unit are structurally and functionally identical, each anchor unit comprising: said fixed anchor point structurally attached to said reference rod and said anchor actuator to which said reference rod is attached; a cylinder plunger positioned in each said anchor actuator that, under pressure deploys the cylinder plunger outward from said anchor actuator, and a deployable anchor point attached to the end of the cylinder.

3. The device of claim 1 wherein said distil frame release unit and said proximal frame release unit are structurally and functionally identical and further wherein said proximal and said distil frame units incorporate structural and functional elements of said anchor units, said proximal and said distil frame release units comprising:

a securing cone, said securing cone being physically attached to the deployable cylinder plunger; and a securing cone seat formed in the opening of a member of the axial frame unit, said securing cone seat having a complimentary, conical shape such that when engaged, said securing cone is positioned in said securing cone seat.

4. The device of claim 1, wherein said registration unit comprises:

a cylinder with a registration rod plunger positioned in said cylinder;

a deployable registration pin capable of moving in response to force applied by said registration rod plunger and further capable of positioning reference rods by insertion into aligned openings in said reference rods; and valve means through which a pressure can be applied to said registration rod plunger move said registration in one direction and additional valve means to reverse the direction of movement, and a travel-limiting mechanism consisting of a slot cut in one said reference rod and a protuberance that is narrower than the said slot cut in the other said reference rod.

5. The device of claim 4 wherein said cylinder is adapted to pneumatic pressure to move said registration rod plunger.

6. The device of claim 4 wherein said cylinder is adapted to hydraulic pressure to move said registration rod plunger.

7. The device of claim 1 wherein said metallic expansion element is physically connected to said proximal reference rod and further positioned to support said displacement transducer;

said displacement transducer being in physical contact with the upper face of said distil reference rod by means of a metallic plunger rod; and, wherein said metallic expansion element is made of a first metal and said proximal reference rod and said distil reference rod being made of the same, second metal, wherein said first metal has a greater coefficient of expansion than said second metal.

8. The device of claim 1 wherein said metallic expansion element is aluminum.

9. The device of claim 1 wherein said metallic expansion element is brass.

* * * * *

UNITED STATES PATENT AND TRADEMARK OFFICE
CERTIFICATE OF CORRECTION

| | | |
|---|---|---|
| PATENT NO. | : 7,347,003 B2 | Page 1 of 1 |
| APPLICATION NO. | : 11/787177 | |
| DATED | : March 25, 2008 | |
| INVENTOR(S) | : Lawrence C. Murdoch et al. | |

It is certified that error appears in the above-identified patent and that said Letters Patent is hereby corrected as shown below:

IN THE SPECIFICATION

Column 1, lines 9-11 -- please correct "...in part by Grant No. 20-201-XXXX-0919-206-2002030 from the National Science Foundation." to read "...in part by Grant No. EAR0001146 from the National Science Foundation."

Signed and Sealed this
Twenty-sixth Day of May, 2015

Michelle K. Lee
*Director of the United States Patent and Trademark Office*